Oct. 9, 1934.     R. S. TROTT     1,976,701
ENGINE MOUNTING
Original Filed July 12, 1929
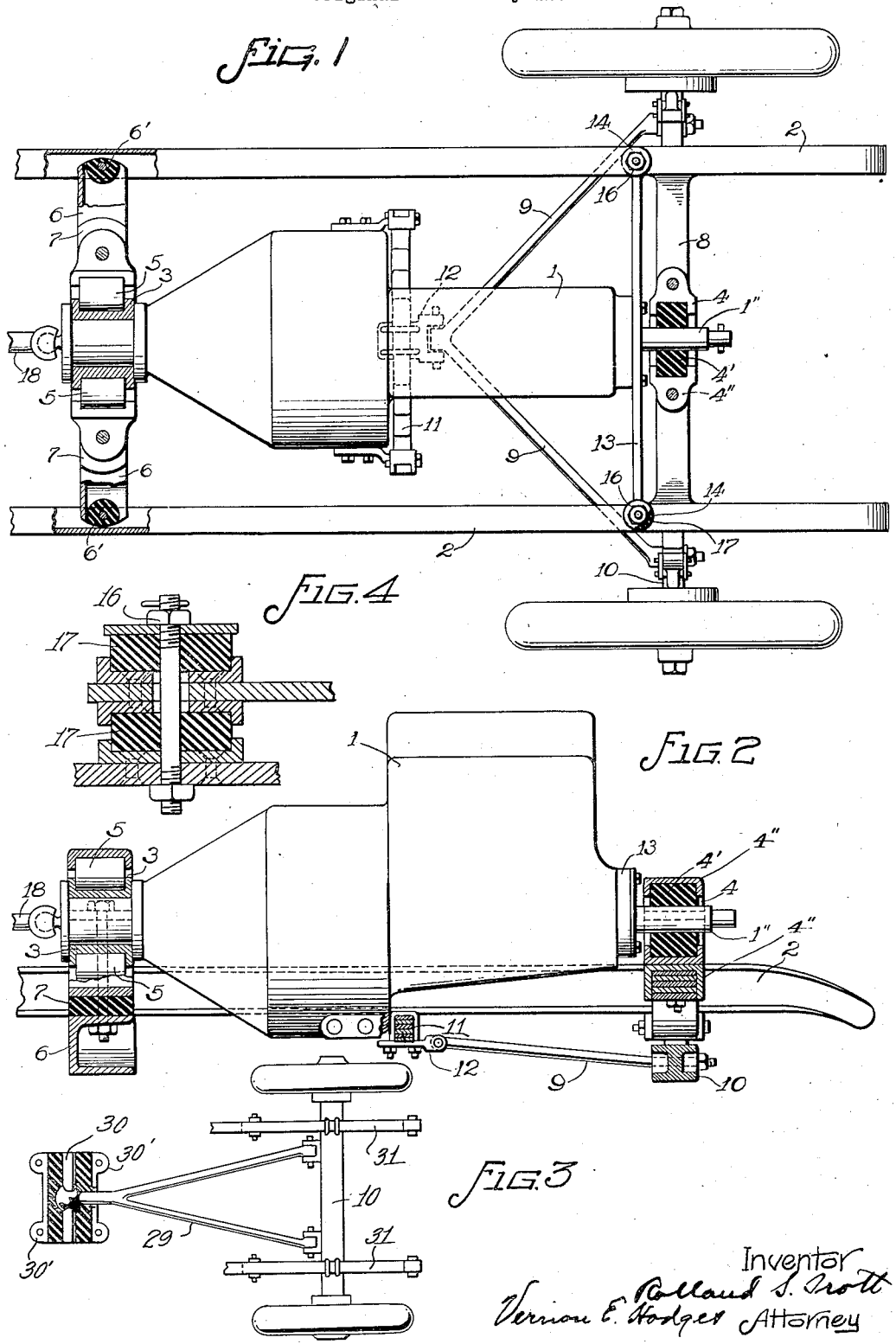

Patented Oct. 9, 1934

1,976,701

UNITED STATES PATENT OFFICE 1,976,701

ENGINE MOUNTING

Rolland S. Trott, Denver, Colo.

Original application July 12, 1929, Serial No. 377,807. Divided and this application November 10, 1931, Serial No. 574,174

10 Claims. (Cl. 180—64)

My invention relates to automotive vehicles having engines mounted to have force and torque cushioning movements with respect to the frame of the vehicle and is a division of my application for patent on Automotive vehicles, filed July 12, 1929, Serial No. 377,807, now Patent No. 1,834,879, granted December 1, 1931.

It is the object of this invention to provide a construction in which substantially the entire weight of the engine unit is supported upon the frame in a manner substantially incapable of transmitting torque reaction to the frame and in which the engine unit is connected to one of the axles in such a way as to transmit to said axle substantially all the torque reaction of the engine unit through a resilient connection, one end of which is connected to the axle, the other end of which is attached to the engine unit, forming the sole connection between the engine unit and the axle or the sole support for an end of the reach.

A further object is to provide such an engine mounting and torque reaction connection in which the engine unit is maintained within reasonable limits of its normal position with respect to the frame by normally inactive limiting means which cooperate with the frame when such limits are exceeded.

In the drawing, which is not in true proportion and which is in parts exaggerated for the sake of clearness:—

Figure 1 is a fragmentary plan view showing the front portion of the chassis of an automotive vehicle equipped with one form of my present invention.

Figure 2 is a side elevation in partial section of Figure 1.

Figure 3 is a detail plan view partly in section of a modified form of torsion reach connection to the power plant or engine unit.

Figure 4 is a section showing a form of rubber mounting.

The engine unit 1 is mounted on the frame 2 by the mountings 3 and 4, which are adapted to provide pivotal movement, or movement substantially equal to pivotal movement. The engine unit in Figures 1 and 2 consists of the engine and clutch housing, the change speed transmission being separate therefrom and not shown.

The rear mounting 3 is provided with the rollers 5 and is supported on the cross member 6 of the frame 2, upon the rubber pad 7.

The cross member 6 is attached to the side members of the frame 2 by the rubber mountings 6', similar to the detail shown in Figure 4, or by any other proper means of attachment.

The mounting 4, which receives the engine bracket 1'', is of any of the well known rubber mounting constructions such as the rubber ring 4' in the split bracket 4'' of Figure 1, or as it may be of the construction shown in Figure 4, and supports the front of the engine unit upon the cross member 8 of the frame 2.

A rubber mounting such as at 4 may be used in place of the mounting 3, if desired, and a pivotal mounting having a ball or roller bearing such as shown at 3 may be used in place of the mounting 4, if desired, and either of them may be used with or without the rubber pad 7.

Or, any other form, type or construction of mounting may be used at either end of the engine unit whether it includes the change speed transmission or is separate therefrom, so long as the result is a complete engine unit mounting that is substantially incapable of transmitting torque reaction to the frame 2 of the vehicle.

The torque reach 9 is solidly attached to the front axle 10 if it is designed to position the front axle against torque reaction; but if semi-elliptic or other forms of springs are used between the axle and the frame which act to position the front axle such as the springs 31 of Figure 3, then a pivotal attachment such as shown in Figure 3 may be used if desired.

The torque spring 11, Figure 1, is properly attached to the engine unit and carries the torque spring bracket 12, upon which is pivotally mounted the end of the torque reach 9 so as to provide pivotal movement of the torque reach 9 to accommodate for the vertical action of the frame springs and the resulting movements of the frame with respect to the axle 10.

The torque spring 11 not only acts to resiliently cushion the torque reaction of the engine unit, but also to permit angular movements of the axle 10 with respect to the frame when the vehicle is passing over uneven roads, obstacles or depressions.

The cross piece 13 secured to the engine unit, carries the normally inactive bumpers 14, the clearance with the side frame members of the frame 2 being adjusted by the nuts 16, by variation of the thickness of the rubber pads 17, or in any other proper manner; see Figure 4. The bumpers 14 are similar to the rubber mounting shown in Figure 4 except for this clearance, since when used as a rubber mounting the clearance is eliminated as shown.

The cross piece 13 may be mounted at any other place along the engine unit desired, so long as it will act to limit the angular movement of the engine unit with respect to the frame 2. And, instead of extending in both directions from the engine unit, it may be made to extend in one direction only, if desired; that is, the rubber bumper or action controller on one of the side frame members may be dispensed with. I prefer the double bumper construction, however.

Any of the various types of shock absorbers or spring control devices, friction, hydraulic, pneumatic or any combination of them may be used in addition to the normally inactive rubber bumpers or in place of them, as desired, so long as the result is the proper limiting of the angular or pivotal movement of the engine unit with respect to the frame.

It will now be seen that as the engine turns the shaft 18, the reaction to the torque thus transmitted will be taken by the torque reach 9 directly to the axle 10, being cushioned by the torque spring 11, the cushioning movement of the engine unit being permitted by the mountings 3 and 4 and the vertical and angular movement of the axle 10 with respect to the engine unit being permitted by the connection between the engine unit and the reach 9.

Since the necessary slight alterations required in the throttle, spark, clutch, brake, radiator, exhaust pipe, pedals, pedal pads and other parts of the vehicle affected, or whose action is affected by the cushioning movement of the engine unit, have been taken up in my former applications and since any intelligent mechanic will at once perceive what is required in this respect, they will not be gone into here.

Since in standard automotive vehicle construction when the engine is separate from the change speed transmission, the pedals and the gear-shift lever are mounted separate from the engine they will be so mounted in such a case in my present invention.

In case the engine is a unit including the change speed transmission, the pedals and gear-shift lever may be mounted on the engine unit as is standard construction in such a case, or they may be mounted upon the frame and properly connected to the engine unit by connections permitting its cushioning movements. But, since this construction was taken up in my former applications and since the necessary details will be obvious to anyone versed in such matters once my inventions are disclosed to him, they will not be gone into further herein.

In Figure 3, the reach 29 is provided with a cross piece 30 in a rubber mounting which is held to the engine unit by a supporting bracket 30' properly attached to the engine unit, the resilience of which mounting acts to permit the vertical as well as the angular movements of the axle 10 and also to cushion the torque reaction of the engine unit.

It is obvious that rubber cushions of various forms and constructions, flat or leaf or coiled springs, or any other resilient form of connection may be used, or any combination of any or all of them may be used on any of the reach constructions or mountings shown or with any other proper reach constructions or mountings which will transmit the torque from the engine unit to one of the axles with substantially none of its passing through the frame, and still permit the usual vertical and angular axle movements.

And, though I prefer the front reach construction to position the engine unit because of the smaller vertical movement and consequent smaller angular movement of the front axle, the rear reach construction may be used if desired, or in fact both reaches may be used to transmit the torque to their respective axles, or both reaches may be used with but one of them equipped to transmit the torque to its axle.

In any case, and with any reach or engine mounting construction, it can be seen that though the weight of the engine unit is carried on the frame, the engine unit is permitted enough pivotal and force cushioning movement so that it may cooperate with the connection to one or both of the axles to transmit all torque reaction without subjecting the frame to such reaction.

Though I have shown means for limiting the torque cushioning movement of the engine unit with respect to the frame, I prefer that such means be so adjusted as to operate only in extreme cases due to excessive angular movement of the controlling axle; and wherever other design and construction features of the vehicle will permit, I believe, if possible, the said limiting means can be dispensed with entirely.

Having now described my invention what I claim as new and desire to protect by Letters Patent is as follows:

1. In the mounting of the engine unit of a motor vehicle having axles, springs mounted on the axles, and a frame mounted on the springs, cushioning means mounting the engine unit upon the frame and permitting free pivotal and transverse cushioning movement of the engine unit with respect to the frame, connecting means connected to one of the axles, and resilient means forming the sole connection between the engine unit and the connecting means.

2. In the mounting of the engine unit of a motor vehicle having axles, springs mounted on the axles, and a frame mounted on the springs, means mounting the engine unit on the frame and permitting a rocking movement of the engine unit with respect to the frame, cushioning means cooperating with the engine unit and the frame and adapted to limit such rocking movement, a connecting member connected to one of the axles, and resilient means as the only means joining the engine unit and the connecting member to oppose said rocking movement of the engine unit with respect to the connecting member.

3. In the mounting of the engine unit of a motor vehicle having axles, springs mounted on the axles, and a frame mounted on the springs, non-metallic cushion means mounting the engine unit on the frame and permitting a cushioned rocking movement of the engine unit with respect to the frame, a stabilizing member connected to one of the axles, and resilient means as the only means connecting the stabilizing member to the engine unit to oppose the rocking movement of the engine unit with respect to the stabilizing member.

4. In the mounting of the engine unit of a motor vehicle having axles, springs mounted on the axles, and a frame mounted on the springs, means mounting the engine unit on the frame and permitting torque and force cushioning movements of the engine unit with respect to the frame, stabilizing means connected to one of said axles, and resilient means as the only means connecting the engine unit to the stabilizing means and adapted to cushion the torque cushioning movements of the engine unit upon said stabilizing means and to accommodate for said cushioning movements.

5. In the mounting of an engine unit of a motor vehicle having axles, springs mounted on the axles, and a frame mounted on the springs, means mounting the engine unit upon the frame at two points and permitting substantially pivotal movement between the engine unit and the frame, axle aligning means connected to one of said axles, and resilient means forming the only means connecting the aligning means to the engine unit and permitting movement due to the vertical and angular movements of said axle with respect to the frame and permitting resiliently opposing relative angular movement of said axle aligning means with respect to the engine unit.

6. In the mounting of the engine unit of a motor vehicle having axles, springs mounted on the axles, and a frame mounted on the springs, means mounting the engine unit upon the frame and permitting force and torque cushioning movements of the engine unit with respect to the frame, axle aligning means connected with an axle, but not directly with the engine unit, and torsionally resilient reaction absorbing means forming the only connection attaching the axle aligning means to the engine unit and permitting vertical axle movements and tilting axle movements in a substantially vertical plane.

7. In a motor vehicle, the combination of supporting wheel and axle means for the vehicle, a frame structure mounted on the wheel and axle means, an engine unit movably supported on the frame structure for torque cushioning oscillatory movement about a longitudinal axis, a reach connected to the wheel and axle means, and resilient means forming the sole connection between said reach and the engine unit and acting to control the position of the engine unit relative to the frame structure.

8. In a motor vehicle, the combination of wheel and axle means, a frame supported thereby, an engine unit supported at two points on the frame and movable relative thereto, a reach connected to the wheel and axle means, and resilient means forming the sole connection between said reach and the engine unit.

9. In a motor vehicle, the combination of wheel and axle means, a frame supported thereby, an engine unit supported at two points on the frame and movable relative thereto, an axle aligning reach connected to the axle, and resilient reaction absorbing means forming the sole connection between the engine unit and the reach.

10. In a motor vehicle, the combination of wheel and axle means, a frame supported thereby, an engine unit supported at two points on the frame and movable relative thereto, a combined reach and resilient means connected in series between the wheel and axle means and the engine unit, said resilient means forming the sole support for an end of the reach.

ROLLAND S. TROTT.